US011251641B2

(12) United States Patent
Ha et al.

(10) Patent No.: US 11,251,641 B2
(45) Date of Patent: Feb. 15, 2022

(54) ELECTRONIC DEVICE COMPRISING A BATTERY

(71) Applicant: Samsung Electronics Co., Ltd., Suwon-si (KR)

(72) Inventors: Jin Soo Ha, Hwaseong-si (KR); Kun Suk Kim, Hwaseong-si (KR); Sung Hoon Kim, Suwon-si (KR); In Sung Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 16/170,276

(22) Filed: Oct. 25, 2018

(65) Prior Publication Data

US 2019/0131817 A1 May 2, 2019

(30) Foreign Application Priority Data

Oct. 26, 2017 (KR) .................. 10-2017-0140170

(51) Int. Cl.
*H02J 7/00* (2006.01)
*H01M 10/44* (2006.01)
*H01M 10/48* (2006.01)
*H01M 10/42* (2006.01)

(52) U.S. Cl.
CPC ....... *H02J 7/00712* (2020.01); *H01M 10/425* (2013.01); *H01M 10/44* (2013.01); *H01M 10/488* (2013.01); *H02J 7/007* (2013.01); *H02J 7/0048* (2020.01)

(58) Field of Classification Search
CPC ................................. H02J 7/00712
USPC ........................................ 320/149
See application file for complete search history.

(56) References Cited

U.S. PATENT DOCUMENTS

| 8,552,877 | B2 | 10/2013 | Martin et al. |
| 8,970,181 | B2 | 3/2015 | Lee et al. |
| 10,211,659 | B2 | 2/2019 | Tian et al. |
| 2005/0200331 | A1* | 9/2005 | Patino ............ H02J 7/008 320/128 |
| 2011/0063119 | A1 | 3/2011 | Martin et al. |

(Continued)

FOREIGN PATENT DOCUMENTS

EP 3 220 470 A1 9/2017
KR 10-2012-0010029 A 2/2012

OTHER PUBLICATIONS

European Search Report dated January 4, 2019; European Appln. No. 18202690.6-1108.

*Primary Examiner* — Eric D Lee
(74) *Attorney, Agent, or Firm* — Jefferson IP Law, LLP

(57) ABSTRACT

An electronic device is provided. The electronic device includes a battery having a rated charging voltage, a rated charging current, and a design capacity, a charging circuit configured to supply power to the battery, and a processor electrically connected to the battery and the charging circuit. The processor is configured to control the charging circuit to charge the battery in different ways based on a plurality of ranges determined based on a full charge capacity (FCC) of the battery, and, when the FCC of the battery is included in a first range from the design capacity to a first capacity lower than the design capacity, control the charging circuit to charge the battery by setting a first voltage lower than the rated charging voltage and setting a first current lower than the rated charging current.

17 Claims, 8 Drawing Sheets

(56) References Cited

U.S. PATENT DOCUMENTS

| | | | |
|---|---|---|---|
| 2012/0019197 A1* | 1/2012 | Lee | H01M 10/44 320/107 |
| 2016/0197506 A1* | 7/2016 | Abiru | H02J 7/0047 320/134 |
| 2017/0244136 A1 | 8/2017 | Wang et al. | |
| 2017/0271903 A1 | 9/2017 | Tian et al. | |

* cited by examiner

ELECTRONIC DEVICE COMPRISING A BATTERY

CROSS-REFERENCE TO RELATED APPLICATION(S)

This application is based on and claims priority under 35 U.S.C. § 119(a) of a Korean patent application number 10-2017-0140170, filed on Oct. 26, 2017, in the Korean Intellectual Property Office, the disclosure of which is incorporated by reference herein its entirety.

BACKGROUND

1. Field

The disclosure relates to an electronic device that supports rapid and long life charging functions for a battery.

2. Description of Related Art

A full charge capacity (FCC) of a battery represents a current chargeable capacity. When the battery is first used, the FCC is equal to a design capacity. However, as the battery deteriorates and the battery is repeatedly charged/discharged, the FCC is reduced. As a life of the battery is shortened, the FCC is also reduced. In this connection, when the battery is rapidly charged, the deterioration of the battery is accelerated, and the life of the battery may be rapidly shortened. As a result, the FCC is rapidly reduced.

The above information is presented as background information only to assist with an understanding of the disclosure. No determination has been made, and no assertion is made, as to whether any of the above might be applicable as prior art with regard to the disclosure.

SUMMARY

In order to prolong a life of a battery, a charging method for overcoming a deterioration phenomenon and a life shortening due to a use of the battery is required. There is also a need for a method that may extend the life of the battery while rapid charging is performed.

Aspects of the disclosure are to address at least the above-mentioned problems and/or disadvantages and to provide at least the advantages described below. Accordingly, an aspect of the disclosure is to provide an electronic device for overcoming the deterioration of the battery while performing rapid charging of the battery.

Additional aspects will be set forth in part in the description which follows and, in part, will be apparent from the description, or may be learned by practice of the presented embodiments.

In accordance with an aspect of the disclosure, an electronic device is provided. The electronic device includes a battery having a rated charging voltage, a rated charging current, and a design capacity, a charging circuit configured to supply power to the battery, and a processor electrically connected to the battery and the charging circuit. The processor is configured to control the charging circuit to charge the battery in different ways based on a plurality of ranges determined based on a full charge capacity (FCC) of the battery, and, when the FCC of the battery is included in a first range from the design capacity to a first capacity lower than the design capacity, control the charging circuit to charge the battery by setting a first voltage lower than the rated charging voltage and setting a first current lower than the rated charging current.

In accordance with another aspect of the disclosure, a battery charging method performed by an electronic device is provided. The method includes charging a battery by setting a first voltage lower than a rated charging voltage of the battery and setting a first current lower than a rated charging current of the battery, when a full charge capacity (FCC) of the battery is included in a first range from a design capacity to a first capacity lower than the design capacity.

According to various embodiments disclosed in the disclosure, the life of the battery may be extended.

Further, the electronic device according to various embodiments disclosed in the disclosure may overcome the battery deterioration while performing rapid charging of the battery.

In addition, various effects that are directly or indirectly grasped through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
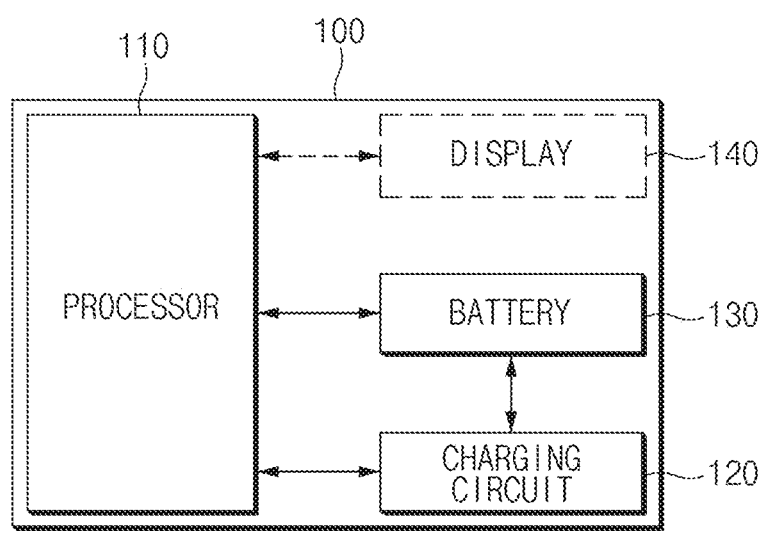
FIG. 1 is a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expressions "have," "may have," "include," and "comprise" or "may include" and "may comprise" used herein indicate existence of corresponding features (e.g., components such as numeric values, functions, operations, or parts) but do not exclude presence of additional features.

In the disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "operatively or communicatively coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, a global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a block diagram of an electronic device according to an embodiment of the disclosure.

Referring to FIG. 1, an electronic device 100 according to an embodiment may include a processor 110, a charging circuit 120, and a battery 130. The electronic device 100 may be referred to, for example, as a smart phone, a PC, a laptop, a tablet PC, or the like.

In one embodiment, the battery 130 may have a rated charging voltage, a rated charging current, and a design capacity, which are preset. For example, the battery 130 may be referred to as one or more cells or a battery pack including plurality of cells connected in series and/or in parallel.

In an embodiment, the charging circuit 120 may provide power to the battery 130. The battery 130 may be charged or rapidly charged by receiving the power from the charging circuit 120.

In an embodiment, the processor 110 may be electrically connected to the charging circuit 120 and the battery 130. The processor 110 may control the charging circuit 120 such that the battery 130 is charged or rapidly charged.

In an embodiment, the processor 110 may control the charging circuit 120 to charge the battery 130 in different ways based on a plurality of ranges determined by a full charge capacity (FCC) of the battery 130. For example, the electronic device 100 may supply a charging voltage and a charging current based on the FCC of the battery 130 to the battery 130 to prevent a deterioration of the battery 130.

In an embodiment, when the FCC of the battery 130 is included in a first range between the design capacity and a first capacity lower than the design capacity, the battery 130 may be charged with a first voltage set lower than the rated charging voltage and a first current set lower than the rated charging current. For example, the electronic device 100 may extend the life of the battery 130 via charging the battery 130 with a voltage and current that is lower than the rated charging voltage and the rated charging current since the first use of the battery 130.

For example, the first voltage may be referenced as the charging voltage supplied to the battery 130 by the charging circuit 120. A voltage value to be reduced from the rated charging voltage may be preset depending on a type and characteristics of the battery 130. The electronic device 100 may supply the battery 130 with the first voltage lower than the rated charging voltage by a preset value.

For example, the first current may be referenced as the charging current supplied to the battery 130 by the charging circuit 120. A current value to be reduced from the rated charging current may be preset depending on the type and characteristics of the battery 130.

In an embodiment, the electronic device 100 may further include a display 140. The electronic device 100 may indicate the life of the battery 130 on the display 140 based on a ratio of the FCC to the design capacity.

Figure 7:
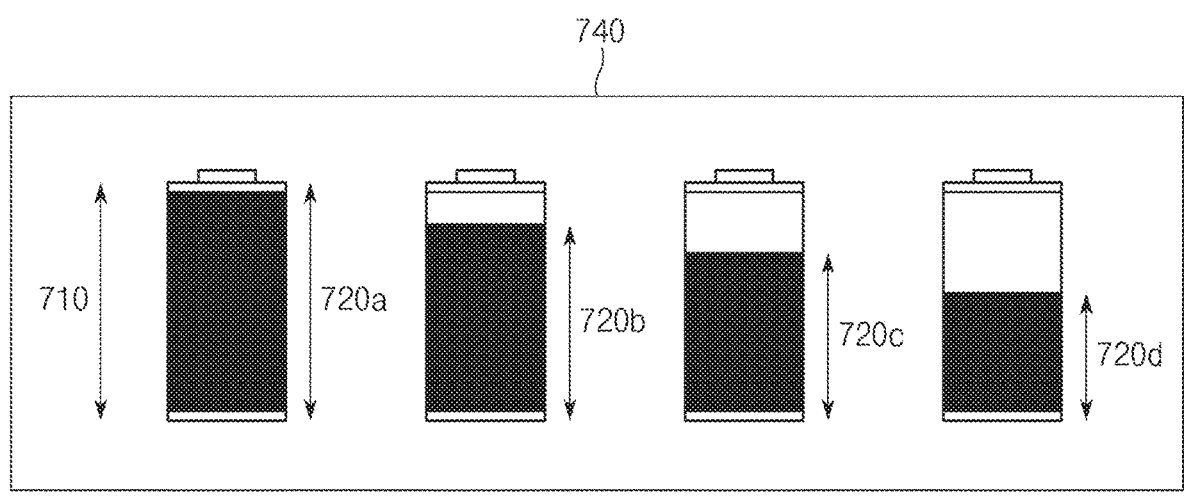
FIG. 7 is an example of a screen showing lives of batteries according to an embodiment of the disclosure.

For example, when the FCC is equal to the design capacity, the life of the battery 130 may be indicated as 100%. When the FCC is half the design capacity, the life of the battery 130 may be indicated as 50%. An embodiment related to the life indication of the battery 130 is shown in FIG. 7 below.

Figure 2:
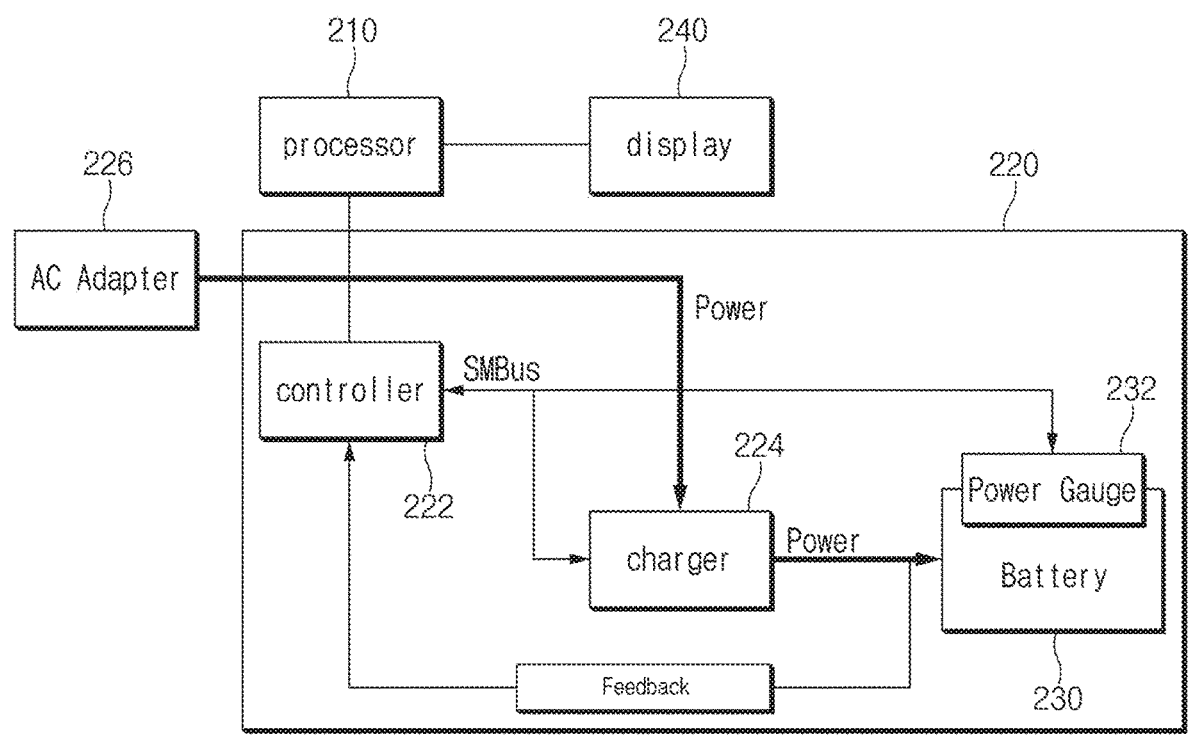
FIG. 2 is a block diagram of an electronic device according to various embodiments of the disclosure.

FIG. 2 is a block diagram of an electronic device according to various embodiments of the disclosure.

In various embodiments, an electronic device 200 (for example, the electronic device 100) may be implemented as shown in FIG. 2. A structure of the electronic device 200 is one example, but is not limited thereto.

Referring to FIG. 2, the electronic device 200 may include a processor 210 (for example, the processor 110 of FIG. 1), a charging circuit 220 (for example, the charging circuit 120 of FIG. 1), and a display 240 (for example, the display 140 of FIG. 1).

In an embodiment, the processor 210 may be electrically connected to the charging circuit 220 and the display 240. For example, the processor 210 may be referenced as a system on chip (SoC).

In an embodiment, the charging circuit 220 may include a controller (or control circuit) 222, a battery 230 (for example, the battery 130 of FIG. 1), a charger (power supply circuit) 224, and an alternating current (AC) adapter 226. The controller 222 may supply a power received from the AC adapter 226 to be supplied to the battery 230 through the charger 224. The battery 230 may have a rated charging voltage, a rated charging current, and a design capacity.

In an embodiment, the processor 210 may control the controller 222 to allow the battery 230 to be charged or rapidly charged. For example, the processor 210 may control the controller 222 to charge the battery 230 in different ways based on a plurality of ranges determined depending on an FCC of the battery 230.

In an embodiment, when the FCC of the battery 230 is included in a first range between the design capacity and a first capacity lower than the design capacity, the processor 210 may set a first voltage set lower than the rated charging voltage and a first current set lower than the rated charging current to charge the battery 230.

In an embodiment, the processor 210 may rapidly charge the battery 230 by keeping the charging voltage and the charging current supplied to the battery 230 close to the rated charging voltage and the rated charging current.

For example, due to an impedance from the charger 224 to the battery 230, a current and a voltage output from the charger 224 and a current and a voltage value supplied to the battery 230 may be different.

For example, the battery 230 may include a measurement module (e.g., power gauge) 232. The controller 222 may obtain a current FCC value of the battery 230 from the measurement module 232. The controller 222 may receive feedback about the voltage and current values supplied to the battery 230 from the measurement module 232 and may correct the lost voltage and current. However, the rapid charging method of the electronic device 200 is not limited thereto, and may include various known rapid charging methods.

Figure 3:
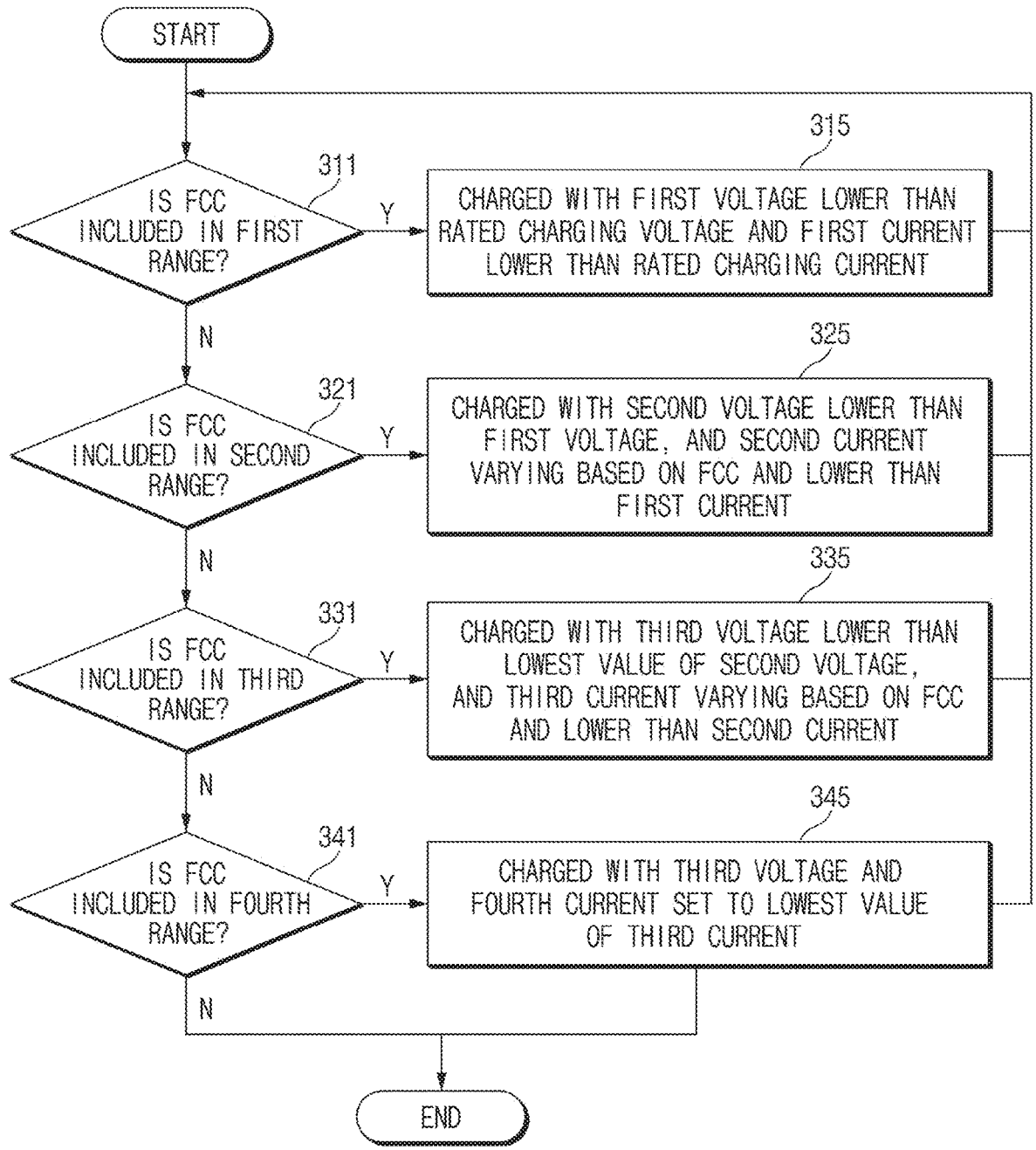
FIG. 3 is a flowchart of a battery charging method performed by an electronic device according to an embodiment of the disclosure.

FIG. 3 is a flowchart of a battery charging method performed by an electronic device according to an embodiment of the disclosure.

Referring to FIG. 3, operations 311, 315, 321, 325, 331, 335, 341, and 345 may be performed, for example, by the electronic device 100 of FIG. 1 or the electronic device 200 of FIG. 2. In the following description of operations 311, 315, 321, 325, 331, 335, 341, and 345, reference numerals of FIG. 1 may be used. Operations 311, 315, 321, 325, 331, 335, 341, and 345 may be implemented with instructions that may be executed by the processor 110 of the electronic device 100.

In an embodiment, the processor 110 of the electronic device 100 may control the charging circuit 120 to charge the battery 130 in different ways based on the plurality of ranges determined based on the FCC of the battery 130. For example, the plurality of ranges may include a first range to a fourth range that are distinguished as the FCC in the battery 130 decreases.

For example, the first range may be referenced as a range between the design capacity and the first capacity lower than the design capacity. The second range may be referenced as a range lower than the first capacity and higher than or equal to a second capacity lower than the first capacity. The third range may be referenced as a range lower than the second capacity and higher than or equal to a third capacity lower than the second capacity. The fourth range may be referenced as a range lower than the third capacity. The values of the first to third capacities may be set in advance in consideration of the characteristics and structure of the battery 130.

In operation 311, the electronic device 100 may determine whether the FCC of the battery 130 is included in the first range. For example, the processor 110 of the electronic device 100 may obtain the current FCC information from the battery 130.

In operation 315, when the FCC is included in the first range, the battery 130 may be charged via setting the voltage lower than the rated charging voltage of the battery 130 and a first current lower than the rated charging current of the battery 130. The electronic device 100 may prevent deterioration of the battery 130 via charging the battery 130 with a voltage and a current lower than the rated charging voltage and the rated charging current in the first range.

When the FCC of the battery 130 is not included in the first range, in operation 321, the electronic device 100 may determine whether the FCC of the battery 130 is included in the second range.

In operation 325, when the FCC of the battery 130 is included in the second range, the electronic device may charge the battery 130 with a second voltage lower than the first voltage of the first range and varying based on the FCC, and a second current lower than the first current of the first range and varying based on the FCC. For example, the electronic device 100 may reduce the charging current and charging voltage based on the decreasing FCC. The electronic device 100 may overcome the deterioration phenomenon of the battery 130 via reducing the charging current and the charging voltage in the second range.

When the FCC of the battery 130 is not included in the second range, in the operation 331, the electronic device 100 may determine whether the FCC of the battery 130 is included in the third range.

In operation 335, when the FCC of the battery 130 is included in the third range, the electronic device 100 may charge the battery 130 with a third voltage equal to a minimum value of the second voltage of the second range and a third current equal to or lower than a minimum value of the second current of the second range, and varying based on the FCC.

For example, the electronic device 100 may maintain the charging voltage constant in the third range, and reduce the charging current based on the decreasing FCC. The electronic device 100 may maintain the charging capacity of the battery 130 by maintaining the charging voltage. The electronic device 100 may overcome the deterioration phenomenon of the battery 130 by reducing the charging current.

When the FCC of the battery 130 is not included in the third range, in operation 341, the electronic device 100 may determine whether the FCC of the battery 130 is included in the fourth range.

In operation 345, when the FCC of the battery 130 is included in the fourth range, the electronic device 100 may charge the battery 130 with the third voltage and a fourth current set to a minimum value of the third current of the third range.

Figure 5:
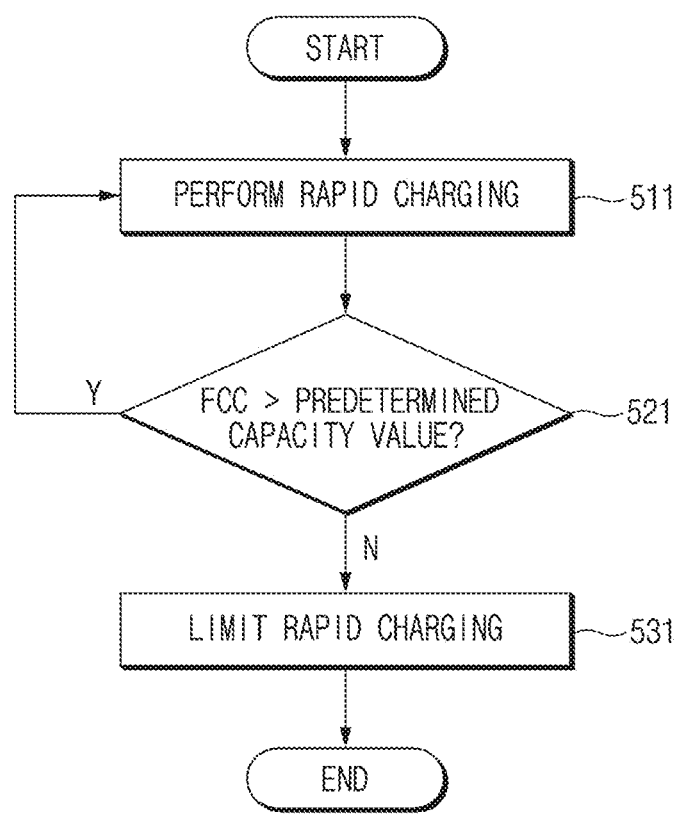
FIG. 5 is a flow chart of a rapid charging method performed by an electronic device according to an embodiment of the disclosure.

In various embodiments, operations 311, 315, 321, 325, 331, 335, 341, and 345 may be performed simultaneously with the rapid charging operation. A related embodiment is shown in FIG. 5 below.

Figure 4:
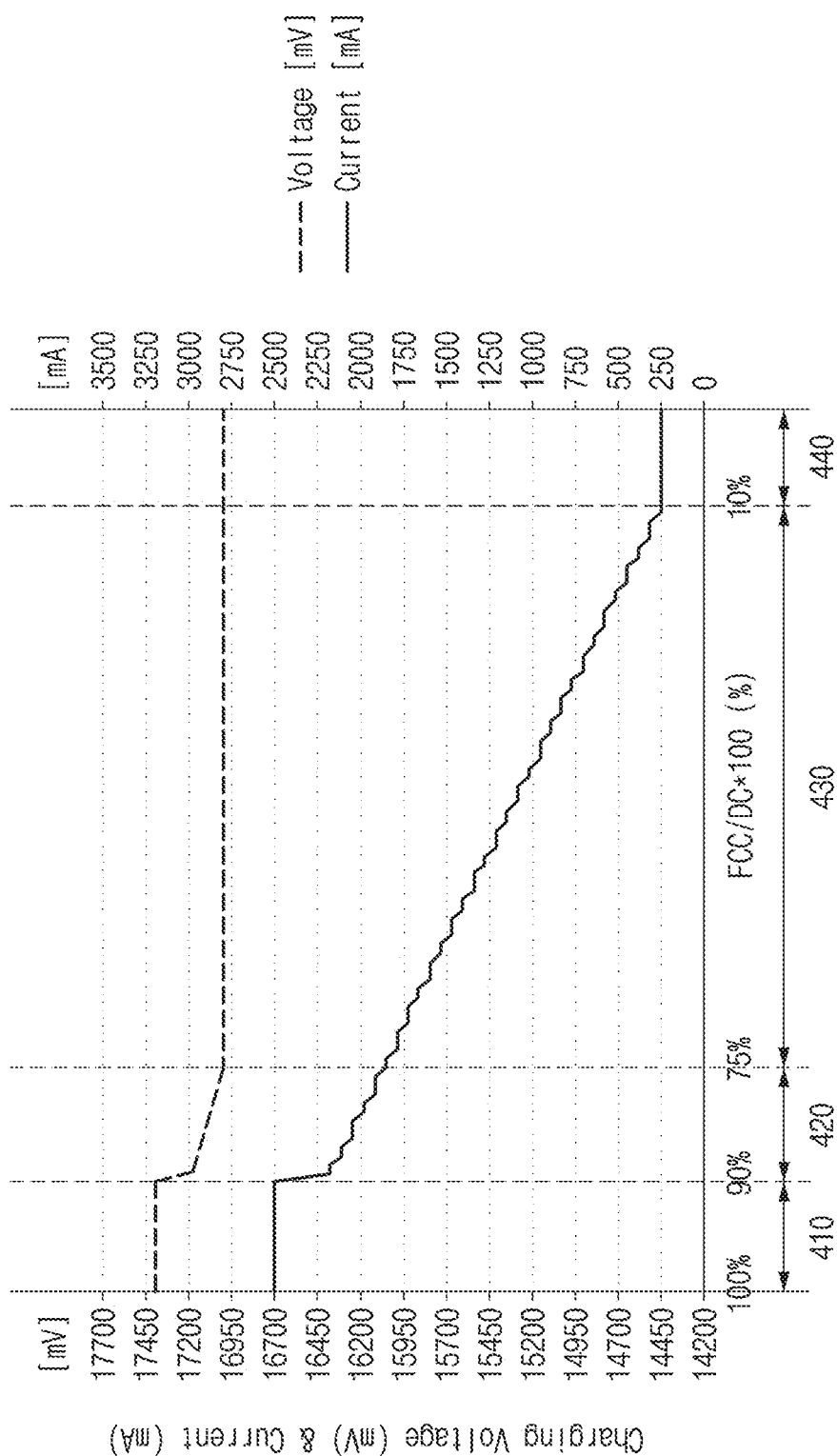
FIG. 4 is a graph illustrating an example of a battery charging method performed by an electronic device according to an embodiment of the disclosure.

FIG. 4 is a graph illustrating an example of a battery charging method performed by an electronic device according to an embodiment of the disclosure.

Referring to FIG. 4, the x axis of the graph represents a ratio (%) of the FCC to the design capacity (DC) of the battery 130, and the y axis represents the charging voltage (mV) and the charging current (mA). For example, ranges 410, 420, 430, and 440 may correspond to the first to fourth ranges in FIG. 3, respectively. The first to fourth ranges of FIG. 3 may be set based on the FCC value or a ratio (%) of the FCC to the design capacity.

For example, first to fourth ranges 410, 420, 430, and 440 of the graph of FIG. 4 may be set to the ratio (%) of the FCC to the design capacity. As an example, the first range 410 may be set to a range where the ratio of the FCC to the design capacity of the battery 130 is from 100% to 90%. The second range 420 may be set to a range where the ratio of the FCC to the design capacity of the battery 130 is lower than 90% and higher than or equal to 75%. The third range 430 may be set to a range where the ratio of the FCC to the design capacity of the battery 130 is lower than 75% and higher than or equal to 10%. The fourth range 440 may be set to a range where the ratio of the FCC to the design capacity of the battery 130 is lower than 10%.

For example, it may be assumed that the design capacity of the battery 130 is set to 3530 mAh, the rated charging voltage is set to 17.6 V, and the rated charging current is set to 2824 mA. It may also be assumed that the battery 130 has a structure in which four battery cells (rated charging voltage of each cell is 4.4 V) are connected in series.

For example, in the first range 410, the electronic device 100 may be configured to reduce the charging voltage per battery cell by 50 mV from the rated charging voltage, and to reduce the charging current by 10% of the charging current. Referring to FIG. 4, the electronic device 100 may charge the battery 130 by setting the charging voltage to 17.4 V and the charging current to 2542 mA.

For example, the electronic device 100 may reduce the charging voltage and the charging current based on the decreasing FCC in the second range 420. Referring to FIG. 4, the charging voltage was reduced from 17.4 V to 17 V. The charging current was reduced from 2542 mA to 1906 mA.

For example, the electronic device 100 may maintain the charging voltage in the third range 430 at the lowest charging voltage of the second range 420. The electronic device 100 may reduce the charging current from the lowest charging current of the second range 420. Referring to FIG. 4, the charging voltage was maintained at 17 V, and the charging current was reduced from 1906 mA to 280 mA.

For example, the electronic device 100 may maintain the charging voltage in the fourth range 440 at the same voltage as the charging voltage of the third range 430. The electronic device 100 may maintain the charging current at the lowest charging current of the third range 430. Referring to FIG. 4, the charging voltage was maintained at 17 V and the charging current was maintained at 280 mA.

FIG. 5 is a flow chart of a rapid charging method performed by an electronic device according to an embodiment of the disclosure.

Referring to FIG. 5, operations 511, 521, and 531 of FIG. 5 may be performed, for example, by the electronic device 100 of FIG. 1 or the electronic device 200 of FIG. 2. Hereinafter, the reference numerals of FIG. 1 are used in the description of operations 511, 521, and 531. Operations 511, 521, and 531 may be implemented with instructions that may be performed by the processor 110 of the electronic device 100.

In operation 511, the electronic device 100 may perform the rapid charging on the battery 130. The rapid charging operation may be performed while the preset reference is satisfied. In order to prevent the life of the battery 130 from being deteriorated due to the rapid charging, the electronic device 100 may limit the rapid charging under certain conditions. For example, the electronic device 100 may interrupt the rapid charging or slow down a charging speed.

For example, in operation 521, the electronic device 100 may compare the FCC of the battery 130 with a predetermined capacity value.

When the FCC of the battery 130 is higher than the predetermined capacity value, the electronic device 100 may continue rapid charging of the battery 130, in operation 511, without interrupting. The electronic device 100 may limit the rapid charging, in operation 531, when the FCC of the battery 130 is smaller than a predetermined capacity value.

In various embodiments, the conditions for limiting the rapid charging operation may be varied. Operation 521 may be performed differently depending on various conditions.

In various embodiments, the electronic device 100 may limit the rapid charging of the battery 130 when the design capacity to FCC ratio of the battery 130 is smaller than the predetermined ratio.

In various embodiments, the electronic device 100 may limit the rapid charging when the number of charge/discharge cycles (life cycle) of the battery 130 is higher than a predetermined number of cycles. For example, the charge/discharge cycle of the battery 130 may be referenced as the number of times that the battery 130 is charged and discharged.

In various embodiments, the electronic device 100 may limit the rapid charging in the second to fourth ranges of FIG. 3.

For example, when the FCC of the battery 130 is lower than the first capacity (for example, the first capacity of FIG. 3) of the first range (for example, the first range of FIG. 3), the electronic device 100 may limit the rapid charging of the battery 130. When the FCC of the battery 130 is lower than the second capacity (for example, the second capacity of FIG. 2) of the second range (for example, the second range of FIG. 2), the electronic device 100 may limit the rapid charging of the battery 130. When the FCC of the battery 130 is lower than the third capacity (for example, the third capacity of FIG. 3) of the third range (for example, the third range of FIG. 3), the electronic device 100 may limit the rapid charging of the battery 130. That is, the electronic device 100 may be configured to limit the rapid charging in the second range, the third range, or the fourth range.

Figure 6:
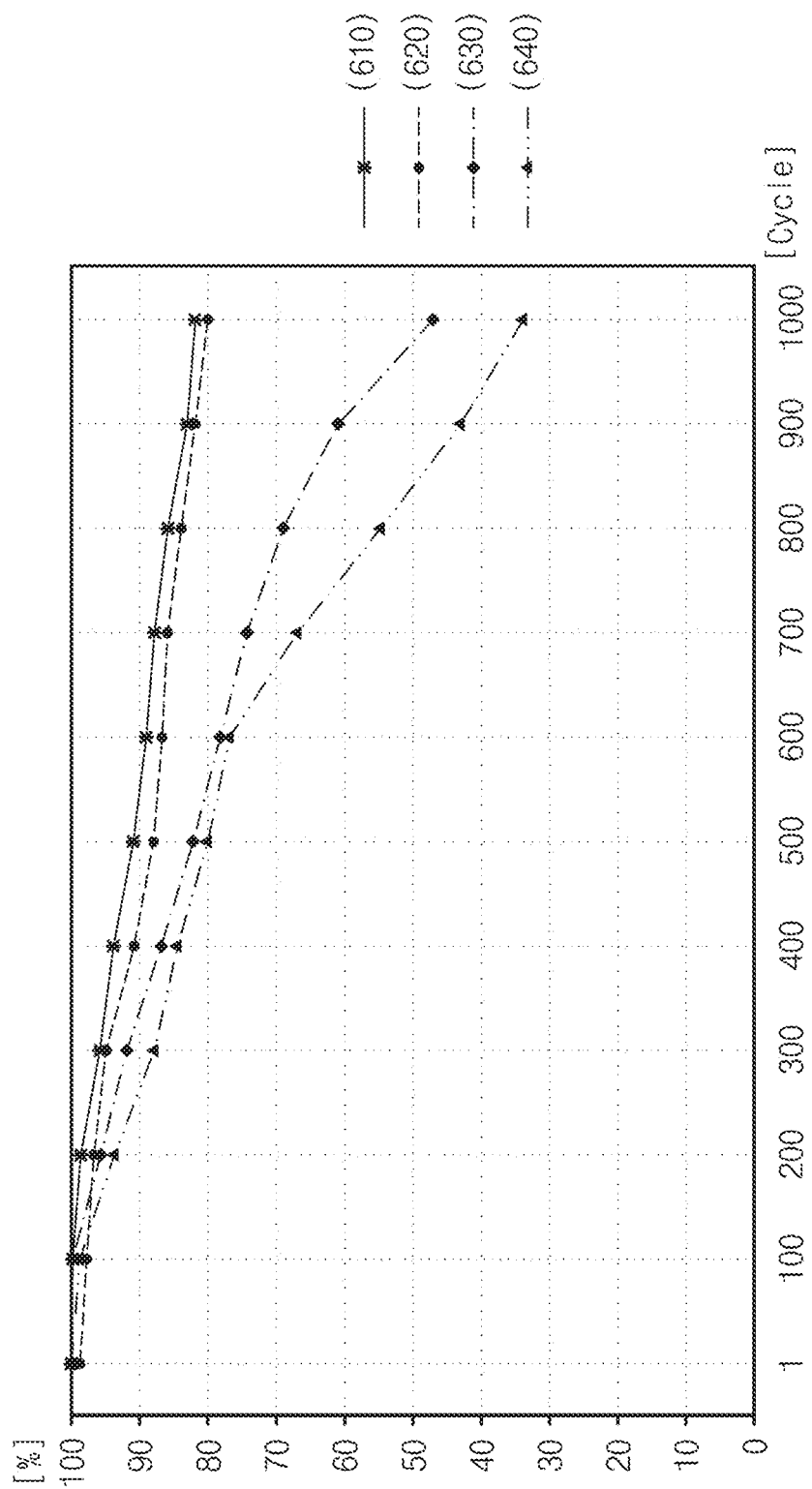
FIG. 6 is a graph comparing battery lives of an electronic device according to various charging methods according to an embodiment of the disclosure.

FIG. 6 is a graph comparing battery lives of an electronic device according to various charging methods according to an embodiment of the disclosure.

Referring to FIG. 6, a graph of a ratio (%) of the FCC to the design capacity (y axis) based on the charge/discharge cycle (x axis) of the battery (for example, the battery 130 of FIG. 1 and the battery 230 of FIG. 2) is shown.

The graph of FIG. 6 includes a graph 610 based on a normal charging of the battery (for example, the battery 130 of FIG. 1 and the battery 230 of FIG. 2), a graph 620 based on the rapid charging with the method for improving the service life of the battery (for example, the battery 130 of FIG. 1 and the battery 230 of FIG. 2) as disclosed in the disclosure, a graph 630 based on the rapid charging with the method of improving the life of the battery (for example, the battery 130 of FIG. 1 and the battery 230 of FIG. 2) according to the related art, and a graph 640 based on the rapid charging of the battery (for example, the battery 130 of FIG. 1 and the battery 230 of FIG. 2).

Referring to the graph 640, when the rapid charging is performed without consideration of the life of the battery (for example, the battery 130 of FIG. 1 and the battery 230 of FIG. 2), the life of the battery (for example, the battery 130 of FIG. 1 and the battery 230 of FIG. 2) may be degraded most drastically.

Referring to the graph 630, the life of the battery (for example, the battery 130 of FIG. 1 and the battery 230 of FIG. 2) is improved, but the life of the battery (for example, the battery 130 of FIG. 1 and the battery 230 of FIG. 2) may be drastically shortened compared with the normal charging graph 610. The method of the graph 630, according to the related art, may include charging the battery (for example, the battery 130 of FIG. 1 and the battery 230 of FIG. 2) with the rated charging voltage and the rated charging current, in particular in the initial use of the battery (for example, the battery 130 of FIG. 1 and the battery 230 of FIG. 2). The initial use of the battery (for example, the battery 130 of FIG. 1 and the battery 230 of FIG. 2) may correspond to the first range of FIG. 3.

Referring to the graph 620, the life of the battery (for example, the battery 130 of FIG. 1 and the battery 230 of FIG. 2) may be approximately similar to that in the normal charging graph 610. The electronic device 100, according to an embodiment of the disclosure, may improve the life of the battery (for example, the battery 130 of FIG. 1 and the battery 230 of FIG. 2) while performing the rapid charging operation.

FIG. 7 is an example of a screen showing lives of the batteries according to an embodiment of the disclosure.

Referring to FIG. 7, a screen of a display 740 (for example, the display 140 of FIG. 1 and the display 240 of FIG. 2) is shown. A design capacity 710 and reducing FCCs 720a, 720b, 720c, and 720d of the battery (for example, the battery 130 of FIG. 1 and the battery 230 of FIG. 2) are indicated. The life of the battery (for example, the battery 130 of FIG. 1 and the battery 230 of FIG. 2) may be visually displayed on the display 740 of the electronic device (for example, the electronic device 100 of FIG. 1 and the electronic device 200 of FIG. 2).

The values of FCCs 720a, 720b, 720c, and 720d may be reduced as the battery (for example, the battery 130 of FIG. 1 and the battery 230 of FIG. 2) deteriorates and the life of the battery (for example, the battery 130 of FIG. 1 and the battery 230 of FIG. 2) is reduced. As shown in FCCs 720a, 720b, 720c, and 720d, it may be visually confirmed that the value of the FCC is reduced.

In various embodiments, the electronic device 100 may indicate the ratio of the FCC to the design capacity, as text on the display 740. For example, values such as 100%, 78%, 50%, etc. may be indicated on the display 740.

In various embodiments, the electronic device 100 may indicate the life of the battery (for example, the battery 130 of FIG. 1 and the battery 230 of FIG. 2) in three stages based on values of the FCCs 720*a*, 720*b*, 720*c*, and 720*d*. For example, the ratio of the FCC 720*a*, 720*b*, 720*c*, and 720*d* to the design capacity 710 may be indicated as 'good' from 100% to 70%, 'normal' from lower than 70% to 30%, and 'shortage' when lower than 30%. The user may determine when to replace the battery (for example, the battery 130 of FIG. 1 and the battery 230 of FIG. 2) via referring to the indication of the display 740.

The electronic device (for example, the electronic device 100 of FIG. 1) according to various embodiments disclosed in the disclosure includes the battery (for example, the battery 130 of FIG. 1) having the rated charging voltage, the rated charging current, and the design capacity, the charging circuit for supplying power to the battery, and the processor (for example, the processor 110 of FIG. 1) electrically connected to the battery and the charging circuit. The processor controls the charging circuit to charge the battery in different ways based on a plurality of ranges determined based on the FCC of the battery. When the FCC of the battery is included in the first range between the design capacity and the first capacity lower than the design capacity, the battery may be charged with the first voltage set to lower than the rated charging voltage and the first current set to lower than the rated charging current.

The electronic device according to various embodiments disclosed in the disclosure further includes the display (for example, the display 140 of FIG. 1). The processor may be configured to indicate the life of the battery on the display based on the ratio of the FCC to the design capacity.

Figure 8:
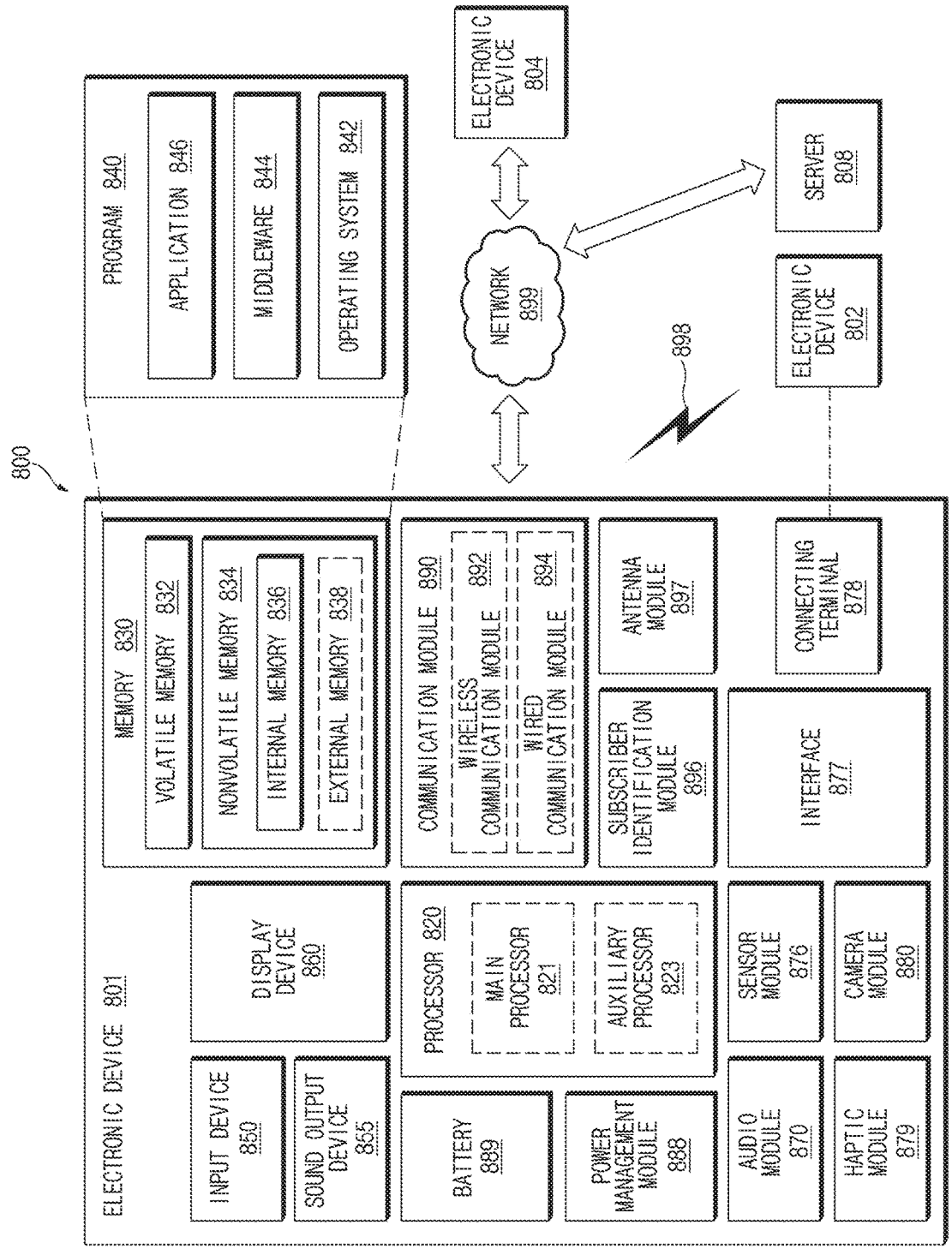
FIG. 8 is a block diagram of an electronic device in a network environment according to various embodiments of the disclosure.

FIG. 8 is a block diagram of an electronic device in a network environment according to various embodiments of the disclosure.

Referring to FIG. 8, an electronic device 801 (e.g., the electronic device 100 of FIG. 1 and the electronic device 200 of FIG. 2) may communicate with an external electronic device 802 through a first network 898 (e.g., a short-range wireless communication) or may communicate with an external electronic device 804 or a server 808 through a second network 899 (e.g., a long-distance wireless communication) in a network environment 800. According to an embodiment, the electronic device 801 may communicate with the external electronic device 804 through the server 808. According to an embodiment, the electronic device 801 may include a processor 820 (e.g., the processor 110 of FIG. 1), a memory 830, an input device 850, a sound output device 855, a display device 860 (e.g., the display 140 of FIG. 1), an audio module 870, a sensor module 876, an interface 877, a haptic module 879, a camera module 880, a power management module 888, a battery 889 (e.g., the battery 130 of FIG. 1), a communication module 890, a subscriber identification module 896, and an antenna module 897. According to various embodiments, at least one (e.g., the display device 860 or the camera module 880) among components of the electronic device 801 may be omitted or other components may be added to the electronic device 801. According to various embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected to the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a CPU or an application processor) and an auxiliary processor 823 (e.g., a graphic processing device, an image signal processor, a sensor hub processor, or a communication processor), which operates independently from the main processor 821, additionally or alternatively uses less power than the main processor 821, or is specified to a designated function. In this case, the auxiliary processor 823 may operate separately from the main processor 821 or be embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823. The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user and may include, for example, a display, a hologram device, or a projector and a controller for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the external electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the external electronic device 802). According to an embodiment, the interface 877 may include, for example, a high-definition multimedia interface (HDMI), a universal serial bus (USB) interface, a secure digital (SD) card interface, or an audio interface.

A connecting terminal 878 may include a connector that physically connects the electronic device 801 to the external electronic device (e.g., the external electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the external electronic device 802, the external electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS communication module) or a wired communication module 894 (e.g., a local area network (LAN) communication module or a power line communication module) and may communicate with the external electronic device using a corresponding communication module among them through the first network 898 (e.g., the short-range communication network such as a Bluetooth, a Wi-Fi direct, or an IrDA (infrared data association)) or the second network 899 (e.g., the long-distance wireless communication network such as a cellular network, an Internet, or a computer network (e.g., LAN or wide area network (WAN))). The above-mentioned various communication modules may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 801 and the external electronic device 804 through the server 808 connected to the second network 899. Each of the external electronic devices 802 and 804 may be the same or different types as or from the electronic device 801. According to an embodiment, all or some of operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the various embodiments do not intend to limit technologies disclosed in the disclosure to the particular forms disclosed herein; rather, the disclosure should be construed to cover various modifications, equivalents, and/or alternatives of various embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B," "at least one of A or/and B," "A, B, or C," or "one or more of A, B, or/and C" and the like used herein may include any and all combinations of one or more of the associated listed items. The expressions "a first," "a second," "the first," or "the second" used in herein may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," and "circuit." The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory," as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc-read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a battery having a rated charging voltage, a rated charging current, and a design capacity;
   a charging circuit configured to supply power to the battery; and
   a processor electrically connected to the battery and the charging circuit,
   wherein the processor is configured to:
      control the charging circuit to rapidly charge the battery by keeping a charging voltage and a charging current supplied to the battery substantially close to the rated charging voltage and the rated charging current,
      repeatedly obtain a full charge capacity (FCC) of the battery from the battery,
      determine if the FCC is above a predetermined threshold value,
      when the FCC of the battery is below the predetermined threshold value, interrupt the rapid charging of the battery,
      control the charging circuit to charge the battery in different ways based on a plurality of ranges determined based on the FCC of the battery,
      when the FCC of the battery is included in a first range from the design capacity to a first capacity lower than the design capacity, control the charging circuit to charge the battery by setting a first voltage lower than the rated charging voltage and setting a first current lower than the rated charging current, and
      when the FCC of the battery is included in a second range lower than the first capacity and higher than or equal to a second capacity lower than the first capacity, control the charging circuit to charge the battery by setting a second voltage lower than the first voltage and setting a second current lower than the first current,
      wherein the second voltage and the second current are repeatedly varying based on the FCC, and
      wherein the second voltage and the second current are repeatedly reduced based on a decreasing of the FCC in the second range.

2. The electronic device of claim 1, wherein, when the FCC of the battery is equal to or lower than a predetermined capacity, the processor is further configured to control the charging circuit to limit the rapid charging of the battery.

3. The electronic device of claim 1, wherein, when a ratio of the FCC to the design capacity is equal to or lower than a predetermined ratio, the processor is further configured to control the charging circuit to limit the rapid charging of the battery.

4. The electronic device of claim 1, wherein, when a number of charge/discharge cycles of the battery is equal to or higher than a predetermined number of cycles, the processor is further configured to control the charging circuit to limit the rapid charging of the battery.

5. The electronic device of claim 1, wherein, when the FCC of the battery is lower than the first capacity, the processor is further configured to limit the rapid charging of the battery.

6. The electronic device of claim 1, wherein, when the FCC of the battery is included in a third range lower than the second capacity and higher than or equal to a third capacity lower than the second capacity, the processor is further configured to control the charging circuit to charge the battery by setting a third voltage equal to a lowest value of the second voltage in the second range and setting a third current lower than a lowest value of the second current in the second range and varying based on the FCC.

7. The electronic device of claim 6, wherein the processor is further configured to, when the FCC of the battery is lower than the second capacity, limit the rapid charging of the battery.

8. The electronic device of claim 6, wherein, when the FCC of the battery is included in a fourth range lower than the third capacity, the processor is further configured to control the charging circuit to charge the battery by setting the third voltage and a fourth current as a lowest value of the third current.

9. The electronic device of claim 8, wherein, when the FCC of the battery is lower than the third capacity, the processor is further configured to limit the rapid charging of the battery.

10. The electronic device of claim 1, further comprising:
a display,
wherein the processor is further configured to indicate a life of the battery on the display based on a ratio of the FCC to the design capacity.

11. An electronic device, comprising:
a battery having a rated charging voltage, a rated charging current, and a design capacity;
a charging circuit including the battery, a charger, and a controller for supplying power to the battery through the charger;
a display; and
a processor electrically connected to the battery, the charging circuit, and the display,
wherein the processor is configured to:
control the charging circuit to rapidly charge the battery by keeping a charging voltage and a charging current supplied to the battery substantially close to the rated charging voltage and the rated charging current,
repeatedly obtain a full charge capacity (FCC) of the battery from the battery,
determine if the FCC of the battery is above a predetermined threshold value,
when the FCC of the battery is below the predetermined threshold value, interrupt the rapid charging of the battery,
control the controller to charge the battery in different ways based on a plurality of ranges determined based on the FCC of the battery,
when the FCC of the battery is included in a first range from the design capacity to a first capacity lower than the design capacity, control to supply, to the battery, a first voltage lower than the rated charging voltage and a first current lower than the rated charging current, and
when the FCC of the battery is included in a second range lower than the first capacity and higher than or equal to a second capacity lower than the first capacity, control the charging circuit to charge the battery by setting a second voltage lower than the first voltage and setting a second current lower than the first current,
wherein the second voltage and the second current are repeatedly varying based on the FCC, and
wherein the second voltage and the second current are repeatedly reduced based on a decreasing of the FCC in the second range.

12. The electronic device of claim 11,
wherein, when the FCC of the battery is included in a third range from the second capacity to a third capacity lower than the second capacity, the processor is further configured to control to supply, to the battery, a third voltage equal to a lowest value of the second voltage and a third current equal to or lower than a lowest value of the second current and varying based on the FCC, and
wherein, when the FCC of the battery is included in a fourth range lower than the third capacity, the processor is further configured to control to supply, to the battery, the third voltage and a fourth current equal to a lowest value of the third current.

13. The electronic device of claim 12, wherein, when the FCC of the battery corresponds to the first capacity, the second capacity, or the third capacity, the processor is further configured to control the controller to limit the rapid charging.

14. The electronic device of claim 11, wherein the processor is further configured to indicate a life of the battery on the display based on a ratio of the FCC to the design capacity.

15. A battery charging method performed by an electronic device, the method comprising:
controlling a charging circuit to rapidly charge a battery by keeping a charging voltage and a charging current supplied to the battery substantially close to a rated charging voltage and a rated charging current;
repeatedly obtaining a full charge capacity (FCC) of the battery from the battery;
determining if the FCC of the battery is above a predetermined threshold value;
when the FCC of the battery is below the predetermined threshold value, interrupt the rapid charging of the battery;
charging the battery, via a charging circuit, by setting a first voltage lower than a rated charging voltage of the battery and setting a first current lower than a rated charging current of the battery, when the FCC of the battery is included in a first range from a design capacity to a first capacity lower than the design capacity; and
charging the battery, via the charging circuit, by setting a second voltage lower than the first voltage and setting a second current lower than the first current, when the FCC of the battery is included in a second range lower than the first capacity and higher than or equal to a second capacity lower than the first capacity,
wherein the second voltage and the second current are repeatedly varying based on the FCC, and
wherein the second voltage and the second current are repeatedly reduced based on a decreasing of the FCC in the second range.

16. The method according to claim 15, wherein the method further comprises:
charging the battery by setting a third voltage equal to a lowest value of the second voltage, and setting a third current equal to or lower than a lowest value of the second current and varying based on the FCC, when the FCC of the battery is included in a third range from the second capacity to a third capacity lower than the second capacity;

charging the battery by setting the third voltage and setting a fourth current equal to a lowest value of the third current, when the FCC of the battery is included in a fourth range lower than the third capacity; and limiting a rapid charging of the battery when the FCC is lower than a predetermined capacity.

17. The method according to claim 16, further comprising indicating a life of the battery on a display based on a ratio of the FCC to the design capacity.

* * * * *